United States Patent
Eun et al.

(10) Patent No.: US 8,334,755 B2
(45) Date of Patent: Dec. 18, 2012

(54) METHOD FOR RECOGNIZING RADIO FREQUENCY IDENTIFICATION TAG READER AND APPARATUS THEREOF

(75) Inventors: Jee Sook Eun, Daejeon (KR); Hee Sook Mo, Daejeon (KR); Hyochan Bang, Daejeon (KR); Se Won Oh, Daejeon (KR); Jae Gak Hwang, Daejeon (KR); Cheol Sig Pyo, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 12/625,228

(22) Filed: Nov. 24, 2009

(65) Prior Publication Data
US 2010/0141402 A1 Jun. 10, 2010

(30) Foreign Application Priority Data

Dec. 5, 2008 (KR) .......... 10-2008-0123305
May 18, 2009 (KR) .......... 10-2009-0043245

(51) Int. Cl.
*H04Q 3/00* (2006.01)

(52) U.S. Cl. .......... 340/10.4; 340/5.1; 340/5.3; 340/5.4; 340/5.5; 340/10.1; 340/10.2; 340/10.3; 340/10.5; 340/572.1; 340/572.2; 340/572.3; 340/572.4; 340/572.9; 709/220; 709/221; 709/222; 710/104; 710/304

(58) Field of Classification Search .......... 340/5.1–5.5, 340/10.1–10.5, 572.1–572.9; 235/375–385; 709/104, 304

See application file for complete search history.

(56) References Cited

U.S. PATENT DOCUMENTS

| | | | |
|---|---|---|---|
| 2007/0046467 A1* | 3/2007 | Chakraborty et al. | 340/572.1 |
| 2009/0007265 A1* | 1/2009 | Torre et al. | 726/22 |
| 2010/0091732 A1* | 4/2010 | Roeder et al. | 370/331 |

FOREIGN PATENT DOCUMENTS

KR 10-2007-0094325 A 9/2007

OTHER PUBLICATIONS

David Brownell, Sun Microsystems, Inc., "Dynamic RARP Extensions for Automatic Network Address", Internet Engineering Task Force (IETF) RFC 1931, Apr. 1996.
Yaron Y. Goland, Ting Cai, Paul Leach, Ye Gu, Microsoft Corporation Shivaun Albright Hewlett-Packard Company, "Simple Service Discovery Protocol/1.0", Internet Engineering Task Force Internet Draft, Oct. 28, 1999 (Expires Apr. 2000).

* cited by examiner

*Primary Examiner* — George Bugg
*Assistant Examiner* — Ojiako Nwugo
(74) *Attorney, Agent, or Firm* — Kile Park Goekjian Reed & McManus PLLC

(57) ABSTRACT

Provided is a method and apparatus for recognizing a radio frequency identification tag reader. In order to obtain protocol addresses of a plurality of radio frequency identification (hereinafter referred to as RFID) tag readers, a request message including a timestamp indicating a generation time is generated and transmitted, and a response message for the request message from one of the plurality of RFID readers is received. When the timestamp included in the response message satisfies a set condition, a hardware address and a protocol address of the RFID reader are extracted from the response message.

13 Claims, 15 Drawing Sheets

FIG. 3A

| Hardware type field (F1) (2byte) | Protocol type field (F2) (2byte) |
| --- | --- |
| Hardware length field (F3) (1byte) + 1byte | Protocol length field (F4) (1byte) + 41byte |
| Operation field (F5) (2bytes) Request13, Response14 | |
| Sender hardware address field (F6) (variable type) | Discovery port field (F7) (1byte) |
| Sender protocol address field (F8) (variable type) | |
| Timestamp field (F9) (4byte) | |
| Receiver hardware address field (F10) (variable type) | Discovery port field (F11) (1byte) |
| Receiver protocol address field (F12) (variable type) | |
| Timestamp field (F13) (4byte) | |

FIG. 3B

| Hardware type field (F1) (2byte) | Protocol type field (F2) (2bytes) | | | | |
|---|---|---|---|---|---|
| Hardware length field (F3) (1byte) | Protocol length field (F4) (1byte) | Operation field (F5) (2bytes) Request11, Response12 | | | |
| Sender hardware address field (F6) | | | | | |
| Sender protocol address field (F8) | | | | | |
| Receiver hardware address field (F10) | | | | | |
| Receiver protocol address field (F12) | | | | | |

FIG. 7

| Source protocol address (4bytes) | | | | |
|---|---|---|---|---|
| Destination protocol address (4bytes) | | | | |
| All 0s (1bytes) | Protocol (17) (1bytes) | UDP total length (2bytes) | | |
| Source port address (2bytes) | | Destination port address (2bytes) | | |
| UDP total length (2bytes) | | Checksum (2bytes) | | |
| Data | | | | |

FIG. 9

| Message type field (1bytes) | Length field (2bytes) | Service ID field (variable type) | Length field (1bytes) | Service value field (variable type) | Length field (1bytes) | Timestamp (8bytes) |

FIG. 10

| Message type field (1bytes) | Length field (2bytes) | | | Timestamp (8bytes) |
|---|---|---|---|---|
| | Length field (1bytes) | Type field (1bytes) | | |
| | Service ID field (variable type) | | | |
| | Length field (1bytes) | Type field (1bytes) | | |
| | Service value field (variable type) | | | |

FIG. 11

| Message type field (1bytes) | Length field (2bytes) | Encoding type field (1bytes) |
|---|---|---|
| Service ID field (1bytes) | Service value field (2bytes) | |
| Timestamp (8bytes) | | |

FIG. 12

| Message type field (1bytes) | Length field (2bytes) | | Encoding type field (1bytes) |
|---|---|---|---|
| Type field (1bytes) | Length field (1bytes) | Service ID field (variable btype) | |
| Type field (1bytes) | Length field (1bytes) | Service value field (variable btype) | |
| Timestamp (8bytes) | | | |

FIG. 13

| Message type field (2) | Length field (80) | | Encoding type field (2) |
|---|---|---|---|
| Message type field (2) | Length field (14) | Service ID field (EPCglobalRM1.0) | |
| Message type field (1) | Length field (2) | Service ID field (5000) | |
| Message type field (2) | Length field (14) | Service ID field (EPCglobalRM1.0) | |
| Message type field (1) | Length field (2) | Service value field (5001) | |
| Message type field (2) | Length field (16) | Service ID field (EPCglobalRM1.0) | |
| Message type field (1) | Length field (2) | Service value field (5002) | |
| Timestamp field (1224642905046) | | | |

METHOD FOR RECOGNIZING RADIO FREQUENCY IDENTIFICATION TAG READER AND APPARATUS THEREOF

CROSS-REFERENCE TO RELATED APPLICATION

This application claims priority to and the benefit of Korean Patent Application Nos. 10-2008-0123305 and 10-2009-0043245 filed in the Korean Intellectual Property Office on Dec. 5, 2008 and May 18, 2009, the entire contents of which are incorporated herein by reference.

BACKGROUND OF THE INVENTION (a) Field of the Invention

The present invention relates to a recognition method and a recognition system, and more specifically, to a method for recognizing a radio frequency identification (hereinafter referred to as RFID) tag reader and an apparatus thereof.

(b) Description of the Related Art

RFID technology includes various levels of software solutions from RFID reader technology that identifies and collects RFID tag data, to RFID middleware technology that receives the tag data collected by the RFID reader to generate events and provides various user application solutions.

Since software technology used to manage the RFID reader is mainly provided by the RFID reader and an adaptor, a user has directly approached the RFID reader and manually performed installation and operation of software. In other words, after the initial installation of the RFID reader and control prior to starting the operation thereof are manually performed, software technology in a mode for processing the RFID tag data collected by the RFID middleware has mainly been used.

However, as the RFID tag technology is advanced, the physical increase in the RFID tag also leads to the physical increase in the RFID reader to be managed. In this case, it is a considerable problem for the user to manually operate all the RFID readers. Recently, as the RFID middleware technology has been developed, the control technology, such as performing the control on the installed RFID reader using the middleware, has been developed, but the initial installation of the RFID reader has still been performed manually.

Generally, since the RFID reader accessing a local network, which can be controlled by the RFID middleware, does not initially have its own protocol address, that is, an Internet Protocol (IP) address, the IP address should be allocated to the RFID reader from an IP distribution server (e.g., DHCP server, RARP server, etc.). However, in order for the RFID reader to complete the initial installation without user intervention, an IP address should be automatically allocated to the RFID reader. Thereafter, in order to communicate the RFID middleware and the RFID reader, it should be recognized that the RFID middleware and the RFID reader acquire any IP address.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for recognizing an RFID frequency identification tag reader and an apparatus thereof having advantages of automatically recognizing an RFID reader without user intervention.

Further, the present invention has been made in an effort to provide a method for recognizing radio frequency identification, a method for recognizing a tag reader, and an apparatus thereof, having advantages of obtaining service configuration information on an automatically recognized RFID reader.

An exemplary embodiment of the present invention provides a method for recognizing an RFID reader of an apparatus for recognizing a plurality of radio frequency identification (hereinafter referred to as RFID) tag readers previously obtaining a protocol address, including: requesting the protocol address of the RFID reader and generating a request message including the hardware address and protocol address of the apparatus, the request message including a timestamp indicating a generation time; transmitting the request message; receiving a response message for the request message from one of the plurality of RFID readers, the response message including the hardware address and protocol address of the corresponding RFID reader and the timestamp of the request message; extracting the hardware address and protocol address of the RFID reader from the response message when the timestamp included in the response message satisfies a set condition; and matching the extracted protocol address to the hardware address of the extracted RFID.

Another exemplary embodiment of the present invention provides an apparatus for recognizing a plurality of radio frequency identification (hereinafter referred to as RFID) tag readers previously obtaining a protocol address, including: a request processor that requests the protocol address of the RFID reader and generates a request message including the hardware address and protocol address of the apparatus, the request message including a timestamp indicating a generation time; a response processor that receives and processes a response message for the request message from one of the plurality of RFID readers, the response message including the hardware address and protocol address of the corresponding RFID reader and the timestamp of the request message; a message table that stores information including the timestamp necessary for generating the request message; and an address table that stores the hardware address and protocol address of the RFID reader, wherein the response processor extracts the hardware address and protocol address of the RFID reader from the response message when the timestamp included in the response message satisfies a set condition.

BRIEF DESCRIPTION OF THE DRAWINGS

FIGS. 3A and 3B are diagrams showing a structure of a message transmitted/received according to an exemplary embodiment of the present invention;

FIG. 7 is a diagram showing a structure of a basic message according to a UDP;

FIG. 8 to FIG. 12 are diagrams showing a structure of a search message for finding service configuration information based on message configuration manners according to an exemplary embodiment of the present invention;

FIG. 13 is a diagram showing a configuration example of a data field of a search message.

DETAILED DESCRIPTION OF THE EMBODIMENTS

Figure 1:
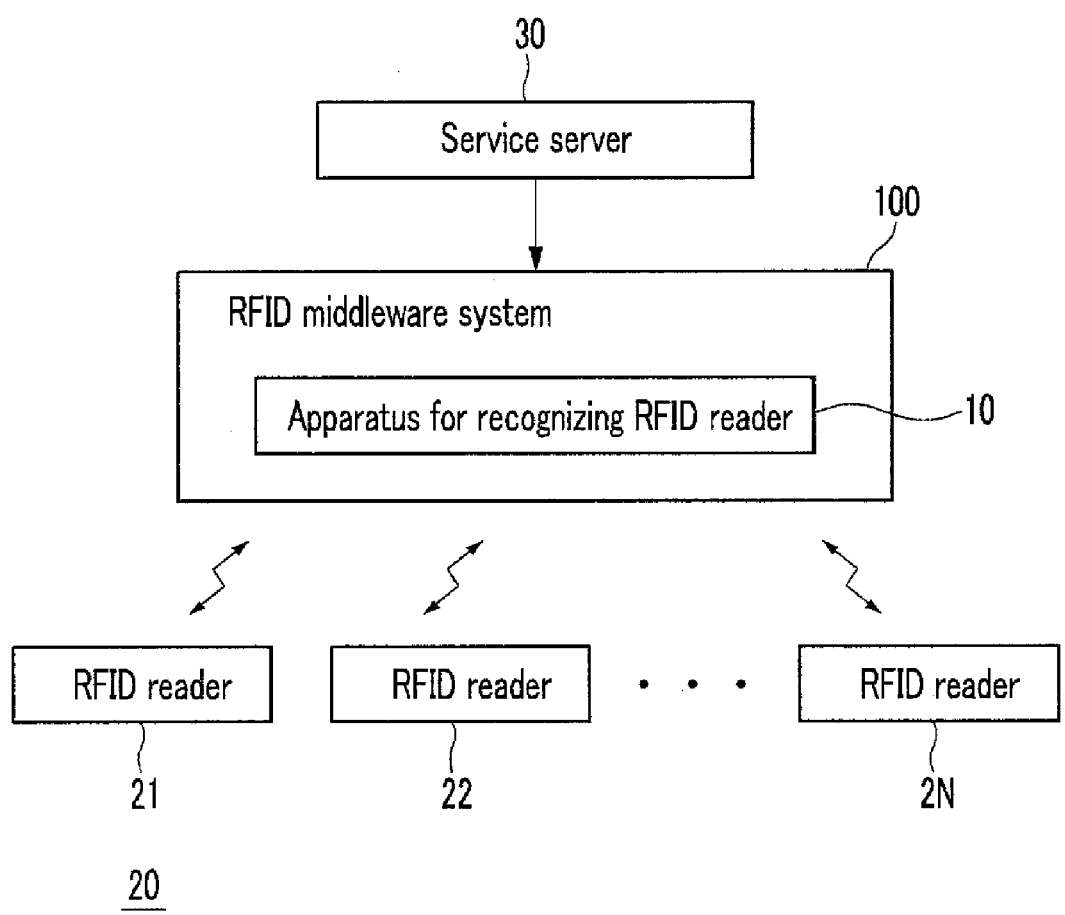
FIG. 1 is a diagram showing a network connection state of an apparatus for recognizing an RFID reader according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. Hereinafter, an exemplary embodiment of the present invention will be described with reference to the accompanying drawings.

Figure 2:
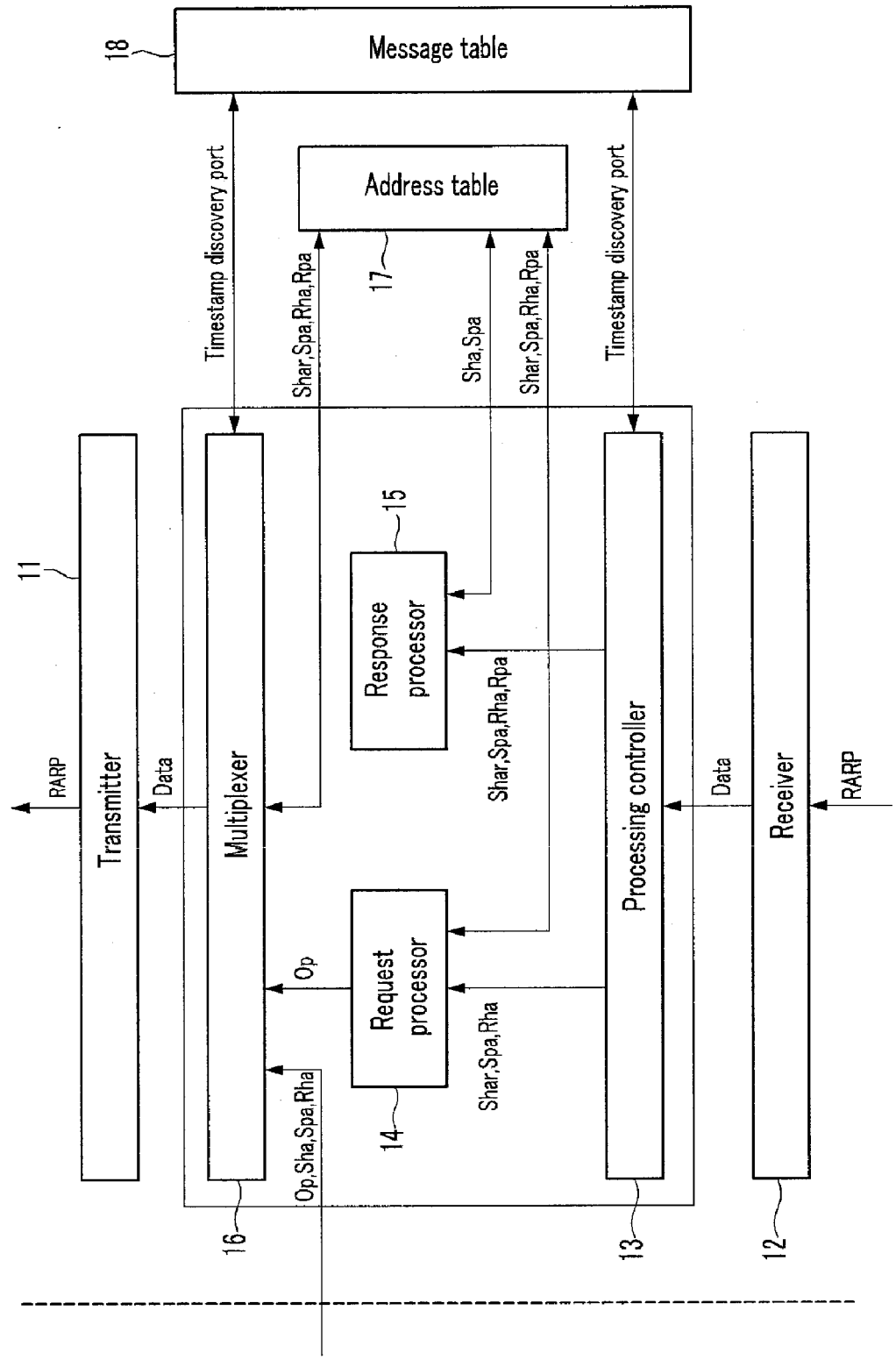
FIG. 2 is a structure diagram of an apparatus for recognizing an RFID reader according to an exemplary embodiment of the present invention.

FIG. 1 is a diagram showing a network connection state of an apparatus for recognizing an RFID reader according to an exemplary embodiment of the present invention, and FIG. 2 is a structure diagram of an apparatus for recognizing an RFID reader according to an exemplary embodiment of the present invention.

As shown in FIG. 1, an apparatus 10 for recognizing an RFID reader according to an exemplary embodiment of the present invention communicates with RFID readers (21, 22, . . . 2N, N=1, 2, 3, . . . , "20" is given for convenience), and the RFID readers 20 are attached to objects to perform a function as sensors and receive information on RFID tags including an unique RFID tag identifier. Further, the apparatus 10 for recognizing an RFID reader obtains service configuration information on the recognized RFID reader 20.

The apparatus 10 for recognizing an RFID reader is configured in a form included in an RFID middleware system 100 that processes data provided from each RFID reader between a service server 30 providing an application service and the RFID reader 20 to be managed and performs a function of controlling the RFID readers 20 according to the application service provided from the service server 30, such that the RFID middleware system 100 can recognize the RFID readers without user intervention. Recognizing the RFID reader in an exemplary embodiment of the present invention indicates obtaining an IP address of the RFID reader to communicate with the RFID reader.

As shown in FIG. 2, the apparatus for recognizing an RFID reader according to an exemplary embodiment of the present invention includes a transmitter 11, a receiver 12, a processing controller 13, a request processor 14, a response processor 15, and a multiplexer 16, and further includes an address table 17 and a message table 18.

The message table 18 stores information necessary to generate data, and in detail, information on a timestamp indicating time and a discovery port indicating a port to be used by a discovery protocol of a newly recognized RFID reader.

The address table 17 stores the address related information of a sender and a receiver. For example, the address table 17 stores information such as a sender hardware address (Sha), a sender protocol address (Spa), a receiver hardware address (Rha), a receiver protocol address (Rpa), etc.

The processing controller 13 performs the RFID reader recognition operation according to the exemplary embodiment of the present invention by linking the request processor 14 with the response processor 15, and performs a function as a parser. In detail, the processing controller 13 extracts the data (operation, timestamp, sender hardware address, sender protocol address, receiver hardware address, receiver protocol address, etc.) from the message received through the receiver 12, and provides the data to the request processor 14 or the response processor 15 according to the operation of the message.

The request processor 14 processes the request message parsed from the processing controller 13 and requests the multiplexer 16 to generate the response message.

The response processor 15 performs the process on the received message, and in detail, extracts the sender hardware address and the sender protocol address included in the response message to recognize the corresponding RFID reader, and stores and manages the extracted address in the address table 17.

The apparatus 10 for recognizing an RFID reader according to the exemplary embodiment of the present invention that is formed in the above structure transmits and receives the message according to a RARP (Reverse Address Resolution Protocol) to recognize the RFID reader, and obtains a protocol address (IP address) from the predetermined RFID reader.

The request message and response message according to the exemplary embodiment of the present invention are messages according to the RARP protocol and messages in the extended form as compared to the existing RARP message, and are formed in a structure as shown in FIGS. 3A and 3B.

FIG. 3A is a diagram showing a structure of a message that is transmitted/received according to an exemplary embodiment of the present invention.

The message according to the exemplary embodiment of the present invention includes the sender hardware address, the sender protocol address, the receiver hardware address, the receiver protocol address, the timestamp, and the discovery port. In detail, as shown in FIG. 3A, the message includes a hardware type field F1 defining a network type, a protocol type field F2 defining a protocol, a hardware length field F3 indicating a byte unit length of a hardware address that is a physical address, a protocol length field F4 indicating a byte unit length of a protocol address that is a logical address, an operation field F5 indicating whether a packet type is request or response, a sender hardware address field F6 indicating a sender hardware address, a first discovery port field F7 indicating a sender discovery port, a sender protocol address field F8 indicating a sender protocol address, a first timestamp field F9, a receiver hardware address field F10 indicating a receiver hardware address, a second discovery port field F11 indicating a receiver discovery port, a protocol address field F12 indicating a receiver protocol address, and a second timestamp field F13. Herein, when the first and second discovery port fields (F7 and F11) recognize the RFID reader and then use an additional protocol for finding out the service between the apparatus 10 for recognizing an RFID reader and the RFID reader 20, they are used to define the port for communication in the case of not using the well-known service port.

As described above, since the message according to the exemplary embodiment of the present invention includes the first and second discovery port fields (F7 and F11) and first and second timestamp fields (F9 and F13), it can be appreciated that it has an extended form as compared to the existing RARP message. Hereinafter, for better comprehension and ease of description, the first and the second discovery port fields (F7 and F11) are referred to as "discovery port fields", and the first and second timestamp fields (F9 and F13) are referred to as "timestamp fields".

Meanwhile, the message according to the exemplary embodiment of the present invention may not include the first and second discovery port fields. Herein, the message can be shown as in FIG. 3B.

FIG. 3B is another diagram showing a structure of a message that is transmitted/received according to an exemplary embodiment of the present invention.

Referring to FIG. 3B, the message may include a hardware type field F1 defining a network type, a protocol type field F2 defining a protocol, a hardware length field F3 indicating a byte unit length of a hardware address that is a physical address, a protocol length field F4 indicating a byte unit length of a protocol address that is a logical address, an operation field F5 indicating whether a packet type is request or response, a sender hardware address field F6 indicating a sender hardware address, a sender protocol address field F8 indicating a sender protocol address, a receiver hardware address field F10 indicating a receiver hardware address, and a protocol address field F12 indicating a receiver protocol address.

Next, a method for recognizing an RFID reader according to the first exemplary embodiment of the present invention will be described with reference to FIG. 3A and FIG. 4.

Figure 4:
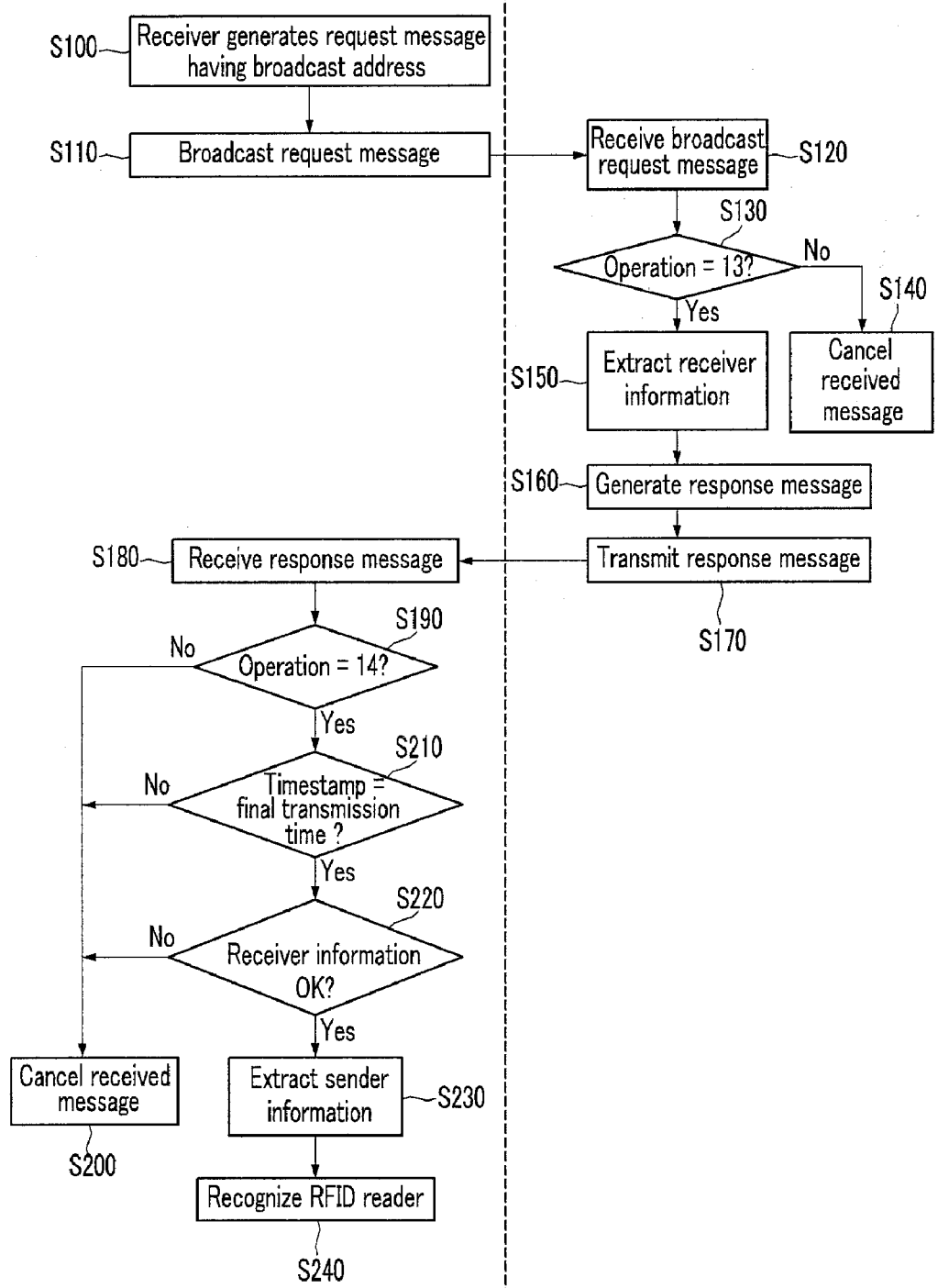
FIG. 4 is a flowchart of a method for recognizing an RFID reader according to the first exemplary embodiment of the present invention.

FIG. 4 is a flowchart of a method for recognizing an RFID reader according to the first exemplary embodiment of the present invention.

First, the apparatus 10 for recognizing an RFID reader generates the request message for requesting the IP address to the RFID reader 20 (S100).

In detail, value "13" indicating that the packet type is the request is recorded in the operation field F5, the hardware address of the apparatus for recognizing an RFID reader is recorded in the hardware address field F6, and the protocol address of the apparatus for recognizing an RFID reader is recorded in the sender protocol address field F8. The broadcast address (0xFFFFFFFFFFFF) is recorded in the receiver hardware address field F10, and the receiver protocol address field F12 is empty. When the apparatus 10 for recognizing an RFID reader wants to serve as a discovery server, a service port number of a service server 30 is recorded in the discovery port field F7. Further, a current time of the apparatus 10 for recognizing an RFID reader is recorded in the timestamp field F9.

As such, a request message including a plurality of information is generated, and the generated message is then broadcast (S110).

As described above, as the request message is broadcast from the apparatus 10 for recognizing an RFID reader, the unspecified RFID readers 20 receive the request message. After S120, any RFID reader 20 receiving the request message generates the response message and transmits it to the apparatus 10 for recognizing an RFID reader. In other words, any RFID reader 20 generates the response message to provide its own protocol address as the response for the request message to the apparatus 10 for recognizing an RFID reader.

At this time, the IP address owned by the RFID reader 20 can be allocated to the RFID reader 20 by using a well-known DHCP server, etc. The exemplary embodiment of the present invention relates to a method for allowing the apparatus for recognizing an RFID reader to obtain an IP address of an RFID reader from the RFID reader to which the IP address is previously allocated. Herein, a detailed description of a method of allocating an IP address to the RFID reader will be omitted.

In more detail, the RFID reader 20 determines whether the value recorded in the operation field F5 of the received request message is "13" to confirm a message requesting the protocol address (S130). If the value recorded in the operation field F5 is not "13", the received message is cancelled (S140).

If the value recorded in the operation field F5 is "13", the hardware address and protocol address of the apparatus 10 for recognizing an RFID reader are obtained from the sender hardware address field F6 and the sender protocol address field F8 of the received request message, respectively (S150), and the response message is generated as follows based on the hardware address and the protocol address (S160).

In other words, the value "14" indicating that the packet type is the response is recorded in the operation field F5, the hardware address of the RFID reader is recorded in the sender hardware address field F6, and the protocol address is recorded in the sender protocol address field F8. The hardware address of the apparatus 10 for recognizing an RFID reader is recorded in the receiver hardware address field F10, and the protocol address of the apparatus 10 for recognizing of the RFID reader is recorded in the receiver protocol address field 12. When the discover port field F7 of the received request message is empty, the discovery port of the RFID reader is recorded therein. Further, the time recorded in the timestamp field of the request message is recorded in the timestamp field F13.

As such, the response message including the plurality of information is generated, and the RFID reader 20 then transmits the response message to the apparatus 10 for recognizing an RFID reader (S170).

If the apparatus 10 for recognizing an RFID reader receives the response message from any RFID reader 20 (S180), the operation field F5 of the response message is first confirmed and then it confirms whether the packet type is the response, that is, if the value is "14" (S190). If the operation field F5 of the response message is not "14", the received response message is cancelled (S200) and the following operation is performed when the value is "14".

It determines whether the value recorded in the timestamp field F13 of the response message is identical with the final transmission time that is the timestamp value recorded in the request message finally generated and broadcast by the apparatus 10 for recognizing an RFID reader (S210). When the value recorded in the timestamp field F13 of the response message, that is, the time is identical with the final transmission time, it is confirmed that the corresponding response message is the response for the request message that is finally generated and broadcast by the apparatus 10 for recognizing an RFID reader. On the other hand, when the time recorded in the timestamp field F13 of the response message is not identical with the final transmission time, the corresponding response message is cancelled.

Next, the apparatus 10 for recognizing an RFID reader confirms whether the receiver of the response message is the apparatus 10 (S220). In other words, when the receiver hardware address recorded in the receiver hardware address field F10 of the response message conforms to its own hardware address and the receiver protocol address recorded in the receiver protocol address field F12 conforms to its own protocol address, it is determined that the receiver of the response message is itself.

In this case, the apparatus 10 for recognizing an RFID reader extracts the sender hardware address and the sender protocol address from the response message to recognize the RFID reader 20 having the corresponding hardware address (S230). In other words, the protocol address of the RFID reader 20 is obtained. The apparatus 10 for recognizing an RFID reader corresponds to the protocol address of the RFID reader 20, and stores and manages it by corresponding to the hardware address of the RFID reader 20 recognized by the address table 17 (S240).

Meanwhile, when the receiver hardware address of the response message does not correspond to its own hardware address and the receiver protocol address does not correspond to its own protocol address, the apparatus 10 for recognizing an RFID reader is determined that the receiver is not itself, thereby cancelling the response message.

The foregoing process described that the apparatus 10 for recognizing an RFID reader receives only the response message for the request message finally broadcast and processes it. However, if the apparatus 10 for recognizing an RFID reader processes all the transmitted request messages prior to receiving the response message, in the above steps, when the value recorded in the timestamp field F13 of the response message is smaller than the current time, that is, the recorded time satisfies an earlier condition than at the current time, the predetermined RFID apparatus is recognized by performing the subsequent steps.

Next, a method for recognizing an RFID reader according to a second exemplary embodiment of the present invention will be described.

In the second exemplary embodiment of the present invention, there is provided the method for recognizing only the RFID reader that is authenticated based on the information of a link layer. The protocol address can be dynamically changed while the medium access control (MAC) address of the network equipment is unique. Therefore, the MAC address can be used as an unique identification value of the network equipment. In the second exemplary embodiment of the present invention, the RFID reader is authenticated based on the MAC address of the RFID reader to identify and interrupt the RFID reader to be connected to the network within the control range of the apparatus 10 for recognizing the RFID reader from the connection time point. Herein, as a method for obtaining the MAC address list of the RFID readers to be controlled by the apparatus 10 for recognizing an RFID reader, various methods known to those skilled in the art can be used. For example, the apparatus 10 for recognizing an RFID reader can receive the MAC address list of the RFID readers from the external authentication server (e.g., RADIUS server, etc.) (not shown), and can directly receive it from the user. The following recognition method is performed after the apparatus 10 for recognizing an RFID reader obtains the MAC address list of the RFID readers.

Figure 5:
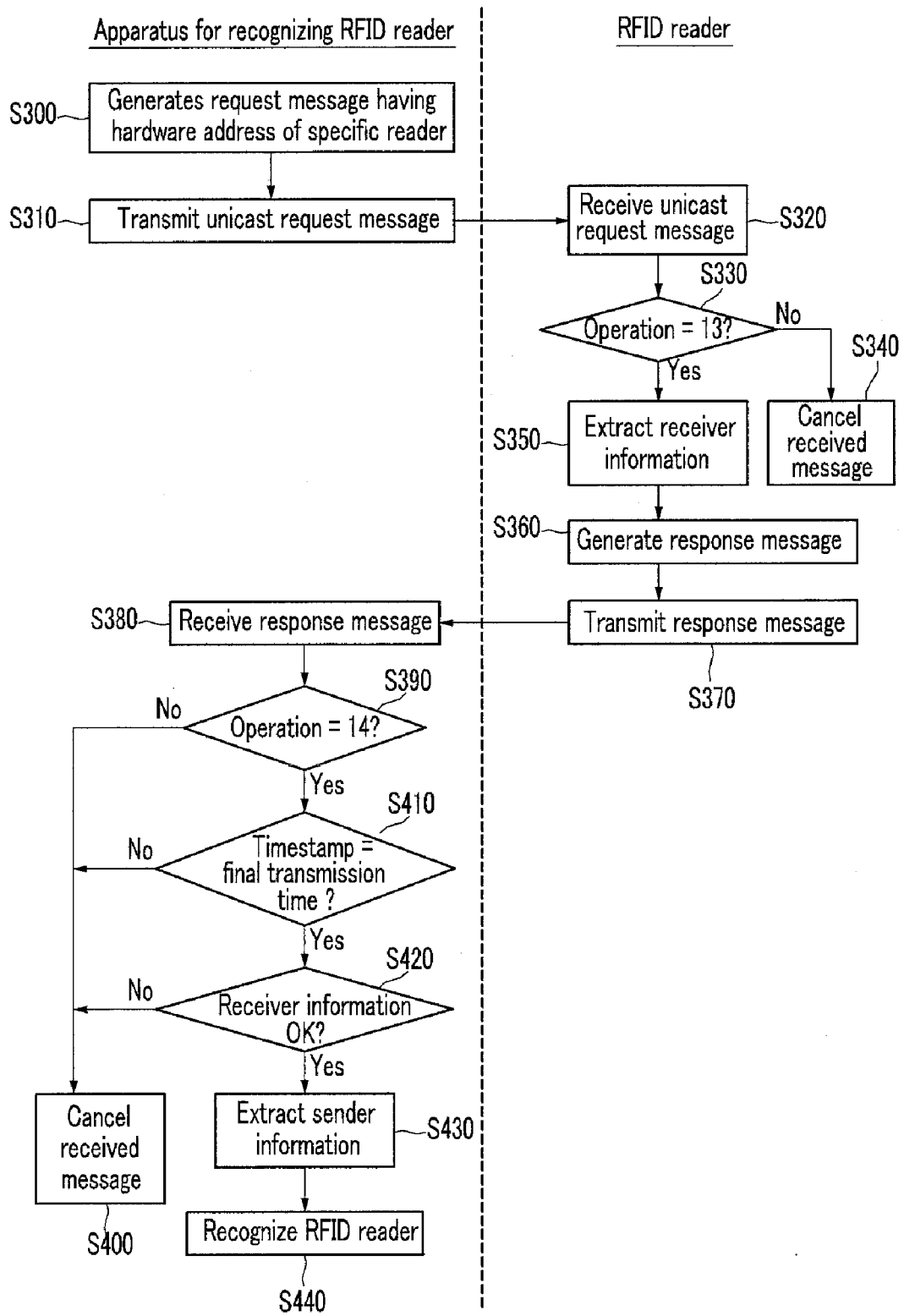
FIG. 5 is a flowchart of a method for recognizing an RFID reader according to a second exemplary embodiment of the present invention.

FIG. 5 is a flowchart of the method for recognizing an RFID reader according to the second exemplary embodiment of the present invention.

First, the apparatus for recognizing an RFID reader allows the RFID reader 20 to generate the request message for requesting the IP address (S300). Similar to the first exemplary embodiment, the corresponding information is recorded in the operation field F5, the sender hardware address field F6, the sender protocol address field F8, the timestamp field F9, and the discovery port field F7, respectively, and unlike the first exemplary embodiment, the broadcast address is not recorded in the receiver hardware address field F10 but the hardware address (i.e., MAC address) of the RFID reader that wants to know the protocol address is recorded therein to designate the specific RFID reader 20 to be recognized.

As such, the request message including the plurality of information is generated and the generated request message, that is, a unicast request message is then transmitted to the corresponding RFID reader 20 (S310).

As described above, the request message transmitted from the apparatus 10 for recognizing an RFID reader is received in the corresponding RFID reader 20. The RFID reader 20 performs the process on the received request message as described in the first exemplary embodiment, and extracts the hardware address and protocol address of the apparatus 10 for recognizing an RFID reader (S320 to S350), generates the response message to provide its own protocol address to the apparatus 10 for recognizing an RFID reader, and provides and transmits it to the apparatus 10 for recognizing an RFID reader (S360 to S370).

When the apparatus 10 for recognizing an RFID reader receives the response message from the RFID reader 20, similar to the first exemplary embodiment, it confirms that the response message is the response for the request message transmitted from itself and the receiver of the response message is itself based on the information that is recorded in the operation field F5 of the response message, the timestamp field F13, and the receiver hardware address field F10 (S380 to S420), and then extracts the sender hardware address and the sender protocol address, respectively, from the message to recognize the RFID reader 20 having the corresponding hardware address (S430 to S440).

That is, the apparatus 10 obtains the protocol address of the RFID reader 20. The apparatus 10 for recognizing an RFID reader finds the MAC address that is the hardware address extracted from the response message from the stored MAC address list to map the protocol address of the obtained RFID reader 20, and stores and manages it in the address table 17.

Through the above processes, the apparatus 10 for recognizing an RFID reader can easily obtain the protocol address of the specific RFID reader 20.

According to the second exemplary embodiment, the unicast request message requesting the protocol address is transmitted using the hardware address of the RFID reader to interrupt the traffic occurrence factor due to the transmission of the broadcast request message, and can be used as the reader authentication function by linking with a separate authentication system.

Meanwhile, if the protocol address of the RFID reader 20 is obtained through the first and second exemplary embodiments, the apparatus 10 for recognizing an RFID reader should recognize the existence of the RFID reader 20 and obtain the service configuration information of the RFID reader 20. The service configuration information is information that is required to configure the control channel between the RFID reader and the apparatus for recognizing an RFID reader by confirming the kind of communication protocols capable of controlling the RFID reader.

Therefore, in the exemplary embodiment of the present invention, as described above, the following processes are additionally performed after recognizing the RFID reader to obtain the service information of the recognized RFID reader.

Figure 6:
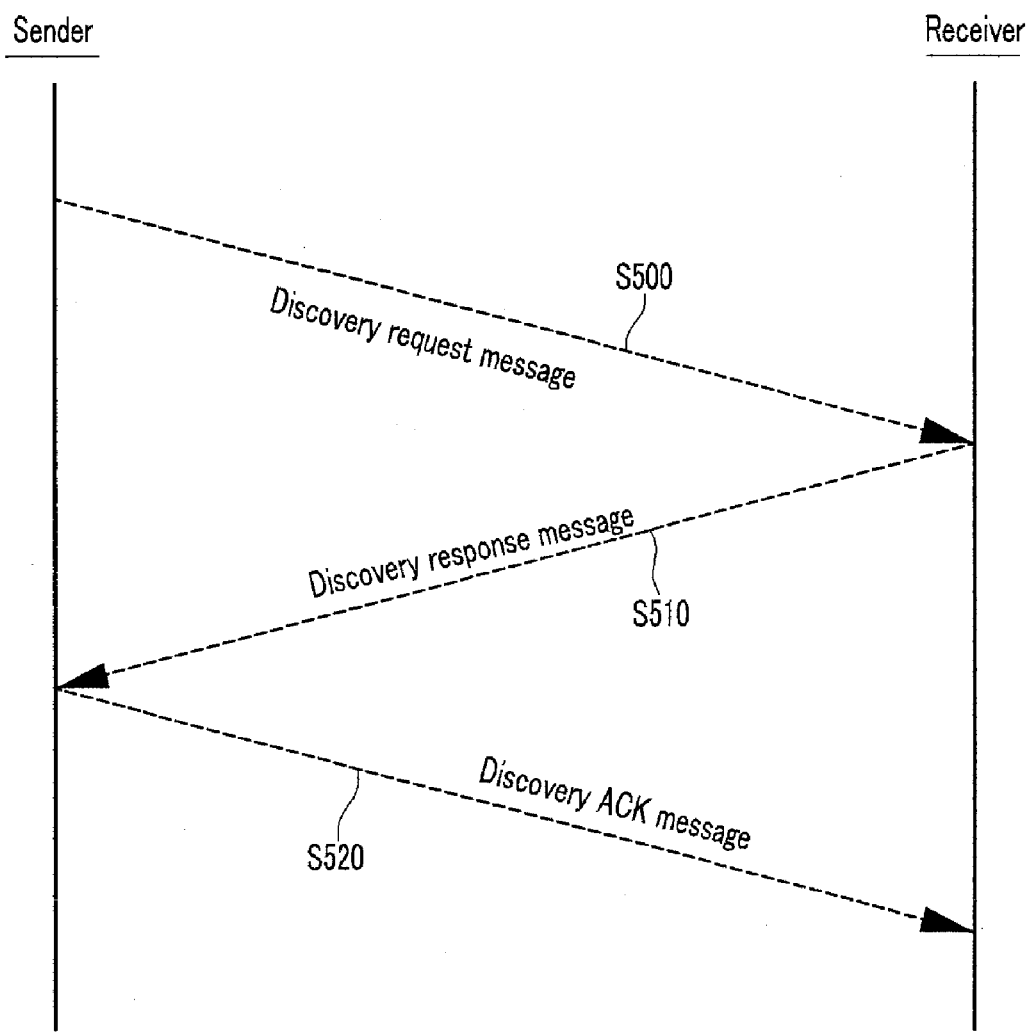
FIG. 6 is a flowchart showing a process to obtain service configuration information of an RFID reader in a method for recognizing an RFID reader according to an exemplary embodiment of the present invention.

FIG. 6 is a flowchart showing a process performed to obtain the service configuration information of an RFID reader in the method for recognizing an RFID reader according to the exemplary embodiment of the present invention.

In the process for obtaining the service configuration information, the sender and receiver are determined by an automatic recognition protocol. That is, when the apparatus 10 for recognizing an RFID reader transmits filling the discovery port field F7 of the request message, the RFID reader 20 senses this situation and determines whether it uses only the discovery port of the apparatus 10 for recognizing an RFID reader and also generates the discovery port of an RFID reader.

If it is determined that the RFID reader uses only the discovery port of the apparatus for recognizing an RFID reader, the sender of the protocol for finding out the service configuration information becomes the RFID reader, and the receiver thereof becomes the apparatus 10 for recognizing an RFID reader. In this case, however, if the RFID reader transmits filling the discovery port field F11 of the response message, the RFID reader performs both the role of the sender using the service port of the apparatus for recognizing an RFID reader and the role of the receiver when the apparatus for recognizing an RFID reader uses the port of the RFID reader.

Meanwhile, if the apparatus 10 for recognizing an RFID reader does not transmit filling the discovery port field F7 of the request message, the RFID reader has to transmit filling the discovery field port F11 of the response message. At this time, the apparatus for recognizing an RFID reader becomes a sender and the RFID reader becomes a receiver. The apparatus for recognizing an RFID reader and the RFID reader can independently use, one by one, the processes for finding out the service configuration information.

As described above, if the sender and receiver for finding out the service configuration information are differentiated according to whether the discovery port is recorded in the discovery port field included in the request message transmitted from the apparatus 10 for recognizing an RFID reader, the sender generated the discovery request message and transmits it as shown in FIG. 6 (S500), and the receiver receiving the discovery request message generates the discovery response message and transmits it (S510). Thereafter, the sender receiving the discovery response message generates the discovery acknowledgement (ACK) message and transmits it to the receiver (S520).

Through the process, the apparatus 10 for recognizing an RFID reader obtains the service configuration information of the recognized RFID reader 20.

In the process for finding out the service configuration information according to the exemplary embodiment of the present invention, the message is transmitted and received through a user datagram protocol (UDP) through the communication channel, and the message according to the UDP is shown in FIG. 7.

FIG. 7 is a diagram showing a structure of a basic message according to the UDP.

As shown in FIG. 7, the UDP message includes a source protocol address field, a destination protocol address field, a source port address field, a destination port address field, a total length field, a checksum field, and a data field.

The exemplary embodiment of the present invention basically uses the structure of the UDP message formed in the above structure, and variously configures the data field such that it generates the messages for finding out different service configuration information. Hereinafter, the search request message, the search response message, and the search ACK message, all of which are used for finding out the service configuration information, are collectively called "service message".

The exemplary embodiment of the present invention configures the search message in multiple forms according to a plurality of message configuration manners, and the message configuration manner can be sorted in a plurality according to how to transmit the service configuration information. The service configuration information includes service identifiers (service ID) differentiating services, and service values including information necessary for the corresponding services.

However, regardless of the message configuration manner, the data field of the search messages in the multiple forms according to the exemplary embodiment of the present invention commonly includes the following fields.

Message type field: It includes integer values indicating the message type. If 1, 2, and 3 are used as the integer values, the corresponding message indicates one of the search request message, the search response message, and the search ACK message according to each value (e.g., search request message (Discovery Request)=1, search response message (Discovery Response)=2, search ACK message (Discovery Ack)=3).

Length field: It indicates a length of a message. In detail, it indicates a length from the message type field to the timestamp field. An integer value indicating the message length by the number of bytes is recorded in the length field.

Timestamp field: it indicates time consumed to generate the search request message and includes integer values that are not negative (−). The timestamp values of all the messages are the same until the search procedure corresponding to one period is completed.

The data field of the search message according to the exemplary embodiment of the present invention is variously configured according to the following message configuration manners while commonly including these fields.

1) A first message configuration manner that transmits the service configuration information with a fixed length.

2) A second message configuration manner that transmits the service configuration information with a variable length.

3) A third message configuration manner that positions the field indicating the type and length of the service configuration information in front of the field of the service configuration information and transfers the service configuration information, wherein the type field differentiates the type of the service configuration information, for example, when the service configuration information is an integer, the type field has "1", and when the service configuration information is a text string, the type field has "2". The length field is an integer value indicating the length of each service configuration information.

4) A fourth message configuration manner used when transmitting the service configuration information using the above 1) and 2) manners, and including an encoding type field that is an identifier indicating whether the corresponding service configuration information has a fixed length while transmitting the service configuration information having the fixed length.

5) A fifth message configuration manner used when transmitting the service configuration information using the above 1) and 2) manners, and including an encoding type field that is an identifier indicating whether the corresponding service information has a variable length while transmitting the service configuration information having a variable length.

FIGS. 8 to 12 are diagrams showing a structure of a discovery message for finding out the service configuration information based on the message configuration manners according to the exemplary embodiment of the present invention.

In each drawing, the service ID field indicating the service identifier (ID) among the service configuration information has an integer value of 1 byte, and the service value field indicating the service information has an integer value of 2 bytes.

Figure 8:
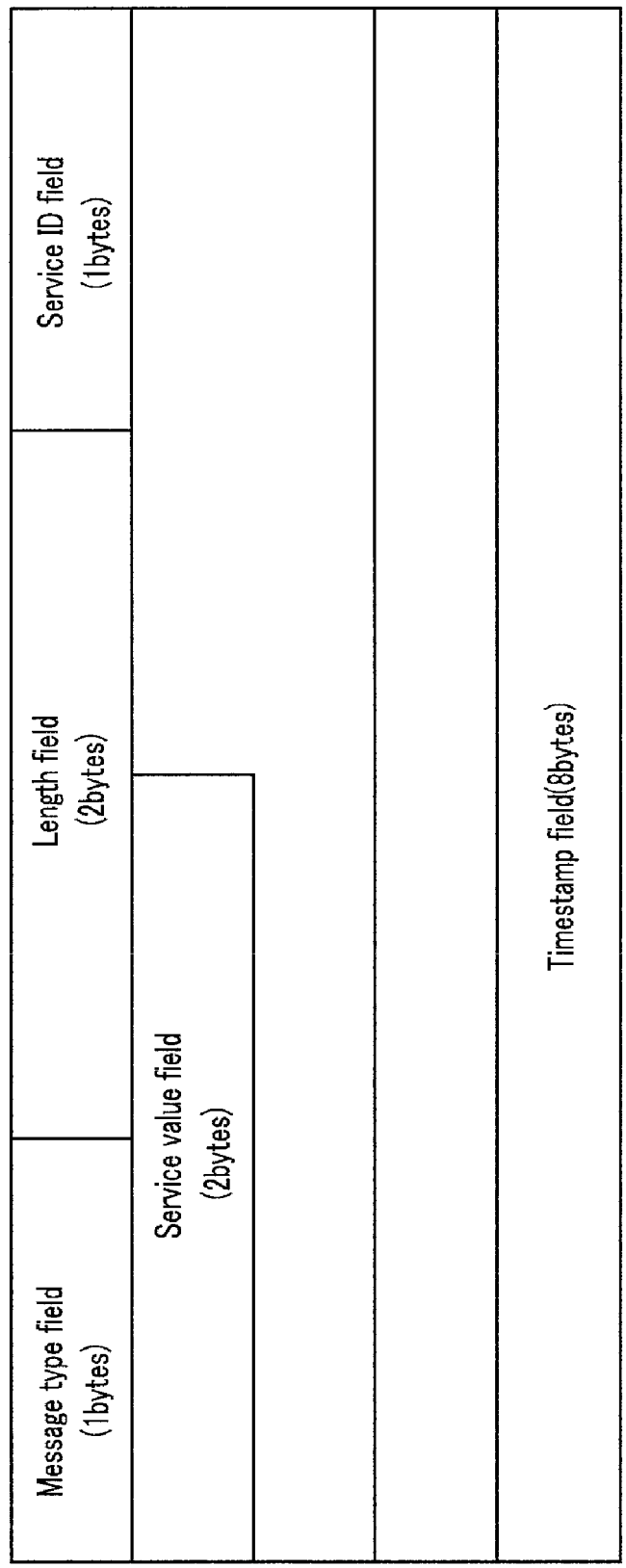

FIG. 8 shows the search message configured of the data field according to the first message configuration manners, and includes the service ID field and the service value field having the fixed length.

FIG. 9 shows the search message configured of the data field according to the second message configuration manner, and includes the service ID field and the service value field having the variable length and includes the length field indicating the length of the service ID field and the length field indicating the length of the service value field. The length field is positioned just before the corresponding information.

FIG. 10 shows the discovery message configured of the data field according to the third message configuration manner, and includes the service ID field and the service value field and includes the length field indicating the length of the service ID field, the type field indicating the type of the service ID field, the length field indicating the length of the service value field, and the type field indicating the type of the service value field. The type field and the length field are positioned just before the corresponding information, and for example, are positioned in an order of the type field, the length field, and the service ID field.

FIG. 11 shows the search message configured of the data field according to the fourth message configuration manner, and includes the service ID field and the service value field and includes the encoding type field indicating the encoding type of the corresponding information. The encoding type field is positioned just before the corresponding information.

FIG. 12 shows the search message configured of the data field according to the fifth message configuration manner, and includes the service ID field and the service value field and further includes the encoding type field indicating the encoding type of the corresponding information, the length field indicating the length of the service ID field, the type field indicating the type of the service ID field, the length field indicating the length of the service value field, and the type field indicating the type of the service value field. The encoding type field is first positioned, and the type field and the length field are positioned just before the corresponding information.

As described above, in an exemplary embodiment of the present invention, the service configuration information is configured of a pair of the service identifier and the service values to transmit the information associated with all the service control protocols between the apparatus for recognizing an RFID reader and the RFID reader.

Meanwhile, in the exemplary embodiment of the present invention, when the apparatus for recognizing an RFID reader finds out the following service information of the RFID reader, the data field of the search message can be configured as shown in FIG. 13. FIG. 13 is a diagram showing a configuration example of the data field of the search message.

<Service Information of RFID Reader for Finding Out Apparatus for Recognizing RFID Reader>
Service name: EPCglobalRM1.0, service port: 5000
Service name: EPCglobalRP1.0, service port: 5001
Service name: EPCglobalLLRP1.0, service port: 5002

As described above, a process for finding out the service configuration information may be implemented by the additional UDP service process form, and therefore the implementation thereof can be very easy.

In order to perform the process for finding out the service configuration information, the apparatus for recognizing an RFID reader according to the exemplary embodiment of the present invention can be made in the following structure.

Figure 14:
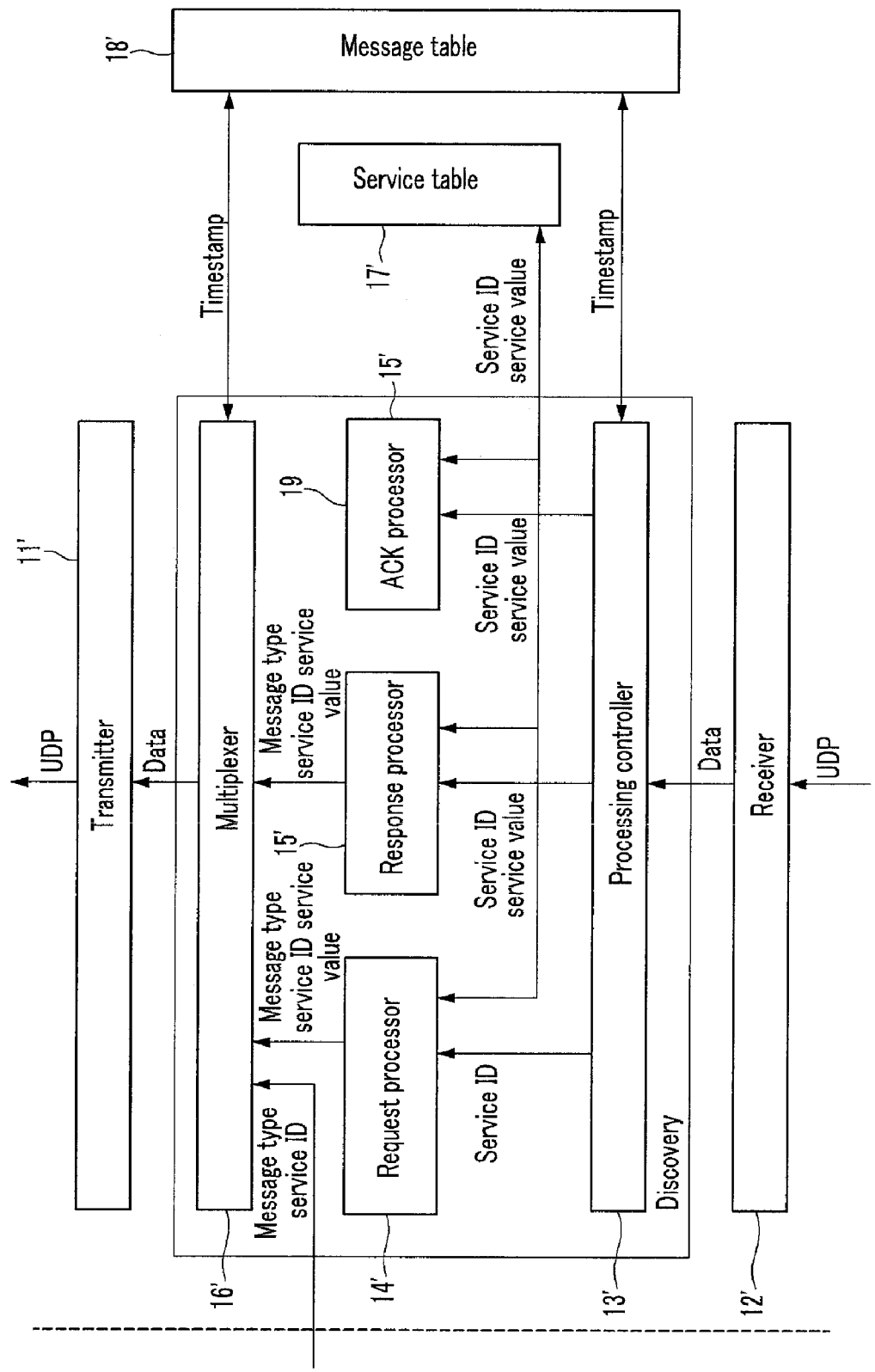
FIG. 14 is a structure diagram of an apparatus for recognizing an RFID reader according to another exemplary embodiment of the present invention.

FIG. 14 is a diagram showing another structure of an apparatus for recognizing an RFID reader according to another exemplary embodiment of the present invention.

Basically, as shown in FIG. 2, the apparatus for recognizing an RFID reader includes a transmitter 11', a receiver 12', a processing controller 13', a request processor 14', a response processor 15', a multiplexer 16', and a message table 18', and unlike the apparatus shown in FIG. 2, includes a service table 17' instead of an address table, and further includes an ACK processor 19.

The message table 18' stores the information necessary to generate data, and in detail, stores information on the timestamp indicating time.

The service table 17' stores the information on the service ID and the service value.

The processing controller 13' is connected to the request processor 14', the response processor 15', and the ACK processor 19 to perform the operation of finding out the service configuration information of the RFID reader that is authenticated according to the exemplary embodiment of the present invention.

In detail, the data is extracted from the message received through the receiver 12' (herein, data is the information of the data field from which the header and padding of the message are removed) request, and is transmitted to the request processor 14', the response processor 15', or the ACK processor 19.

When the request processor 14' receives the request message, it processes the request message to generate the response message, and transmits the generated response message to the transmitter 11'. The ACK processor 19 performs the ACK processing on the discovery response message. When the response processor 15' receives the response message, it processes the response message to generate the ACK message and transmits the generated ACK message to the transmitter 11'.

The apparatus for recognizing an RFID reader according to the exemplary embodiment of the present invention formed in the above structure is operated based on the above-described method, and a person of an ordinary skill in the art can implement the operation of the apparatus for recognizing an RFID reader. Therefore, the detailed description of the operation of the apparatus for recognizing an RFID reader will be omitted.

Further, in FIG. 14, the transmitter 11', the receiver 12', the processing controller 13', the request processor 14', the response processor 15', the multiplexer 16', and the message table 18' may be the same as constituent elements shown in FIG. 2. However, they can be implemented in a form further performing the operation of finding out the service configuration operation. Of course, if necessary, separate elements from the constituent elements shown in FIG. 2 can be implemented.

The exemplary embodiment of the present invention can obtain the protocol address of the RFID reader by using the message according to the extended RARP (Reverse Address Resolution Protocol), and at the same time, can dynamically determine the sender and receiver of service by finding the service configuration information of the corresponding RFID reader. In particular, the apparatus for recognizing an RFID reader automatically recognizes the RFID reader without the user performing any operation, such that the RFID reader can form the RFID reader environment operated in a plug-and-play manner. As a result, the present invention can provide considerable convenience for initializing and operating a large number of RFID readers.

Further, the extended RARP message according to the exemplary embodiment of the present invention can be generated by an additional module without changing an engine performing the existing ARP or RARP, making it possible to very easily implement the apparatus.

The above-mentioned exemplary embodiments of the present invention are not only embodied only by a method and apparatus. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for an apparatus to recognize a plurality of radio frequency identification (hereinafter referred to as RFID) tag readers previously obtaining a protocol address, comprising:
    requesting the protocol address of the RFID reader and generating a request message including the hardware address and protocol address of the apparatus, the request message including a timestamp indicating a generation time;
    transmitting the request message;
    receiving a response message for the request message from one of the plurality of RFID readers, the response message including the hardware address and protocol address of the corresponding RFID reader and the timestamp of the request message;
    extracting the hardware address and protocol address of the RFID reader from the response message when the timestamp included in the response message satisfies a set condition; and
    matching the extracted protocol address to the hardware address of the extracted RFID reader,
    wherein the request message and the response message further include a discovery port field indicating a port for obtaining service configuration information of the RFID reader.

2. The method for recognizing an RFID reader of claim 1, wherein
    the transmitting the request message broadcasts the request message by including a broadcast address in a receiver hardware address of the request message.

3. The method for recognizing an RFID reader of claim 1, wherein, in the state of obtaining a hardware address list of the plurality of RFID readers,
    the transmitting the request message transmits the request message to the RFID reader to be recognized by including the hardware address of the RFID reader to be recognized as the receiver hardware address in the request message.

4. The method for recognizing an RFID reader of claim 1, wherein
    the extracting extracts the hardware address and protocol address of the RFID reader from the response message when a time of the timestamp included in the response message is identical with a time of finally generating the request message by the apparatus.

5. The method for recognizing an RFID reader of claim 1, wherein
    the extracting allows the apparatus to extract the hardware address and protocol address of the RFID reader from the response message when a time of the timestamp included in the response message is earlier than a final transmission time of finally transmitting the request message.

6. The method for recognizing an RFID reader of claim 1, further comprising,
    when the apparatus records and transmits the information on the predetermined port to the discovery port field of the request message and the RFID reader uses the discovery port:
        the apparatus receives a search request message for obtaining the service configuration information from the RFID reader;
        the apparatus transmits as a response for the search request message a search response message that includes a service identifier and a service value including information necessary for the corresponding service; and
        the apparatus receives a search ACK message from the RFID reader.

7. The method for recognizing an RFID reader of claim 6, wherein
    the search response message, the search request message, and the search ACK message include a data field, which is one of the plurality of forms, according to a plurality of message configuration manners, and
    the data field includes a message type field message indicating a message type, a message length field indicating a message length, and a timestamp field indicating a time of generating the corresponding message.

8. The method for recognizing an RFID reader of claim 7, wherein the plurality of message configuration manners are at least one of:
    a first message configuration manner transmitting the service configuration information with a fixed length,
    a second message configuration manner transmitting the service configuration information with a variable length,
    a third message configuration manner transmitting the service configuration information by positioning a field indicating the type and length of the service configuration information in front of the field of the service configuration information,
    a fourth message configuration manner including an encoding type field, which is a identifier indicating whether the corresponding service configuration information has a fixed length, while transmitting the service configuration information having a fixed length, or
    a fifth message configuration manner including an encoding type field, which is a identifier indicating whether the corresponding service configuration information has a variable length, while transmitting the service configuration information having a variable length.

9. The method for recognizing an RFID reader of claim 1, further comprising,
  when the apparatus does not record the information on the predetermined port in the discovery port field of the request message:
    the apparatus receives the response message in which the port for obtaining the service configuration information is recorded in the discovery port field from the RFID reader receiving the request message;
    the apparatus transmits a search request message for obtaining the service configuration information of the RFID reader to the RFID reader;
    the apparatus receives as a response to the search request message a search response message that includes a service identifier and a service value including information necessary for the corresponding service from the RFID reader; and
    the apparatus transmits a search ACK message for the search response message to the RFID reader.

10. An apparatus for recognizing a plurality of radio frequency identification (hereinafter referred to as RFID) tag readers previously obtaining a protocol address, comprising:
  a request processor that requests the protocol address of the RFID reader and generates a request message including the hardware address and protocol address of the apparatus, the request message including a timestamp indicating a generation time;
  a response processor that receives and processes a response message for the request message from one of the plurality of RFID readers, the response message including the hardware address and protocol address of the corresponding RFID reader and the timestamp of the request message;
  a message table that stores information including the timestamp necessary for generating the request message; and
  an address table that stores the hardware address and protocol address of the RFID reader,
  wherein the response processor extracts the hardware address and protocol address of the RFID reader from the response message and stores it in the address table when the timestamp included in the response message satisfies a set condition,
  wherein the request message and the response message further include a discovery port field indicating a port for obtaining service configuration information of the RFID reader.

11. The apparatus for recognizing an RFID reader of claim 10, wherein, when the apparatus records and transmits the information on the predetermined port to the discovery port field of the request message and the RFID reader uses the discovery port, the response processor receives a search request message for obtaining the service configuration information from the RFID reader and transmits a search response message including a service identifier for the search request message and a service value including information necessary for the corresponding service.

12. The apparatus for recognizing an RFID reader of claim 11, further comprising
  a service table that stores the service identifier, which is the service configuration information, and the service value including information necessary for the corresponding service.

13. The apparatus for recognizing an RFID reader of claim 10, wherein,
  when the apparatus does not record the information on the predetermined port in the discovery port field of the request message and receives the response message where the port for obtaining the service configuration information is recorded in the discovery port field from the RFID reader receiving the request message,
  the request processor generates a search request message for obtaining the service configuration information of the RFID reader and transmits the search request message to the RFID reader, and
  if the apparatus receives a search response message for the search request message from the RFID reader, it further includes an ACK processor that generates a search ACK message.

* * * * *